US007752300B2

(12) United States Patent
Havard (10) Patent No.: US 7,752,300 B2
(45) Date of Patent: Jul. 6, 2010

(54) AUTOMATICALLY DETERMINING MANAGEMENT INFORMATION BASE MODULES FOR A DEVICE

(75) Inventor: Victor L. Havard, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 11/942,340

(22) Filed: Nov. 19, 2007

(65) Prior Publication Data

US 2009/0132719 A1    May 21, 2009

(51) Int. Cl.
*G06F 15/16* (2006.01)
*G06F 17/30* (2006.01)
*G06F 7/06* (2006.01)

(52) U.S. Cl. .................. 709/223; 709/220; 707/103 R; 707/E17.055; 707/3; 707/E17.014

(58) Field of Classification Search ................. 709/223, 709/230, 220; 707/103, E17.055, E17.014, 707/103 R, 3
See application file for complete search history.

(56) References Cited

U.S. PATENT DOCUMENTS

| | | | | | |
|---|---|---|---|---|---|
| 5,509,123 | A | * | 4/1996 | Dobbins et al. | 709/243 |
| 5,541,911 | A | * | 7/1996 | Nilakantan et al. | 370/422 |
| 6,122,639 | A | * | 9/2000 | Babu et al. | 707/103 R |
| 6,138,122 | A | * | 10/2000 | Smith et al. | 707/103 R |
| 6,292,829 | B1 | * | 9/2001 | Huang et al. | 709/223 |
| 6,332,142 | B1 | * | 12/2001 | LeBlanc | 707/100 |
| 6,430,613 | B1 | * | 8/2002 | Brunet et al. | 709/223 |
| 6,484,160 | B1 | * | 11/2002 | Richard et al. | 707/2 |
| 6,532,241 | B1 | * | 3/2003 | Ferguson et al. | 370/469 |
| 6,539,540 | B1 | * | 3/2003 | Noy et al. | 717/141 |
| 6,631,406 | B1 | * | 10/2003 | Clouthier et al. | 709/223 |
| 6,947,964 | B2 | * | 9/2005 | Nishio | 709/202 |
| 7,433,925 | B1 | * | 10/2008 | Shenkar et al. | 709/206 |
| 2001/0044822 | A1 | * | 11/2001 | Nishio | 709/202 |
| 2003/0084176 | A1 | * | 5/2003 | Tewari et al. | 709/230 |
| 2004/0122922 | A1 | * | 6/2004 | Da Palma et al. | 709/223 |

(Continued)

OTHER PUBLICATIONS

Case, J. et al., "Management Information Base (MIB) for the Simple Network Management Protocol (SNMP)", http://www.faqs.org/rfcs/rfc3418.html (Date Obtained from the Internet Jan. 22, 2008) Dec. 2002, 21 pages.

(Continued)

*Primary Examiner*—Alina N. Boutah
(74) *Attorney, Agent, or Firm*—DeLizio Gilliam, PLLC (57) ABSTRACT

Described herein are processes and devices that automatically determine management information base (MIB) modules for a device. One of the devices described is a MIB detection device. The MIB detection device can automatically filter a first set of MIB modules to isolate all MIB modules (1) that are fully supported by a Simple Network Management Protocol enabled device and (2) that are unique to a manufacturer of the device, resulting in a second set of MIB modules. The MIB detection device can also automatically parse the second set to determine all MIB modules referenced in the second set. The MIB detection device automatically retrieves the referenced MIB modules and automatically parses those retrieved MIB modules to obtain additional referenced MIB modules. The MIB detection device continues automatically parsing and retrieving until reaching a management information base hierarchy root, resulting in a supported set of objects for managing the device.

20 Claims, 7 Drawing Sheets

U.S. PATENT DOCUMENTS

| | | | |
|---|---|---|---|
| 2005/0053016 A1* | 3/2005 | Kawai et al. | 370/254 |
| 2005/0129097 A1* | 6/2005 | Strumpf et al. | 375/219 |
| 2005/0251569 A1* | 11/2005 | Nishio | 709/223 |
| 2006/0221952 A1* | 10/2006 | Basso et al. | 370/389 |
| 2006/0221961 A1* | 10/2006 | Basso et al. | 370/390 |
| 2006/0230309 A1* | 10/2006 | Kromer et al. | 714/11 |
| 2007/0088688 A1* | 4/2007 | Faulkner et al. | 707/4 |
| 2007/0100871 A1* | 5/2007 | Clemm et al. | 707/102 |
| 2008/0025327 A1* | 1/2008 | Kumar | 370/401 |
| 2009/0116404 A1* | 5/2009 | Mahop et al. | 370/254 |

OTHER PUBLICATIONS

Case, J. et al., "Structure of Management Information Version 2 (SMIv2)", http://www.faqs.org/rfcs/rfc2578.html (Date Obtained from the Internet Jan. 22, 2008) Apr. 1999, 36 pages.

McCloghrie, Keith et al., "Conformance Statements for SMIv2", http://www.faqs.org/rfcs/rfc2580.html (Date Obtained from the Internet Jan. 22, 2008) Apr. 1999, 23 pages.

McCloghrie, Keith et al., "Management Information Base for Network Management of TCP/IP-based internets: MIB-II", http://www.faqs.org/rfcs/rfc1213.html (Date Obtained from the Internet Jan. 22, 2008) Mar. 1991, 58 pages.

Rose, Marshall T. et al., "Concise MIB Definitions", http://www.faqs.org/rfcs/rfc1212.html (Date Obtained from the Internet Jan. 22, 2008) Mar. 1991, 16 pages.

Rose, Marshall T. et al., "Structure and Identification of Management Information for TCP/IP-based Internets", http://www.faqs.org/rfcs/rfc1155.html (Date Obtained from the Internet Jan. 22, 2008) May 1990, 17 pages.

Rose, Marshall T., et al., "Structure and Identification of Management Information for TCP/IP-based Internets", http://www.faqs.org/rfcs/rfc1155.html,(May 1990).

Rose, Marshall T., "Concise MIB Definitions", http://www.faqs.org/rfcs/rfc1212.html,(Mar. 1991).

McCloghrie, Keith et al., "Management Information Base for Network Management of TCP/IP-based internets: MIB-II", http://www.faqs.ord/rfcs/rfc1213.html,(Mar. 1991).

McCloghrie, Keith et al., "Conformance Statements for SMIv2", http://www.faqs.org/rfcs/rfc2580.html,(Apr. 1999).

Case, J. et al., "Management Information Base (MIB) for the Simple Network Management Protocol (SNMP)", http://www.faqs.org/rfcs/rfc3418.html,(Dec. 2002).

Case, J. et al., "Structure of Management Information Version 2 (SMIv2)", http://www.faqs.orq/rfcs/rfc2578.html,(Apr. 1999).

\* cited by examiner

AUTOMATICALLY DETERMINING MANAGEMENT INFORMATION BASE MODULES FOR A DEVICE

BACKGROUND

1. Technical Field

Embodiments of the inventive subject matter relate generally to management information base related systems, and more particularly to automatically determining management information base modules for a Simple Network Management Protocol (SNMP) enabled device.

2. Background Art

One of the primary problems faced by network administrators today is figuring out what SNMP Management Information Base (MIB) modules are supported by a given device. This is especially true if the device is OID or is no longer supported by a manufacturer. Network administrators spend significant amounts of time looking for the MIBs supported by a device and, therefore, lack the ability to manage the device. Many companies cannot use a device which cannot be managed, requiring them to purchase new equipment.

SUMMARY

Described herein are processes and devices that automatically determine management information base (MIB) modules for a device. One of the devices described is a MIB detection device. The MIB detection device can automatically filter a first set of MIB modules to isolate all MIB modules that (1) that are fully supported by a Simple Network Management Protocol enabled device and (2) and that are unique to a manufacturer of the device, resulting in a second set of MIB modules. The MIB detection device can also automatically parse the second set to determine all MIB modules referenced in the second set. The MIB detection device automatically retrieves the referenced MIB modules and automatically parses those retrieved MIB modules to obtain additional referenced MIB modules. The MIB detection device continues automatically parsing and retrieving until reaching a management information base hierarchy root, resulting in a supported set of objects for managing the device.

BRIEF DESCRIPTION OF THE DRAWING(S)

The present embodiments may be better understood, and numerous objects, features, and advantages made apparent to those skilled in the art by referencing the accompanying drawings.

DESCRIPTION OF ILLUSTRATIVE EMBODIMENTS

The description that follows includes exemplary systems, methods, techniques, instruction sequences and computer program products that embody techniques of embodiments of the invention(s). However, it is understood that the described embodiments of the invention(s) may be practiced without these specific details. For instance, although examples refer to querying a database for MIB modules, the MIB modules could be obtained from other types of data storage devices, files, or repositories not just databases. In other instances, well-known instruction instances, protocols, structures and techniques have not been shown in detail in order not to obfuscate the description.

Introduction

A communications network consists of various network devices that talk to each other. When they talk to each other, the network devices need to be able to understand each other so they can transfer data in a meaningful way. Consequently, standards groups have created design protocols (e.g., guidelines or rules) that designers should follow for creating the network devices, and software used with the network devices, so that the network devices can understand each other. One of these protocols is called the Simple Network Management Protocol (SNMP).

SNMP is used in network management systems to monitor network devices for conditions that warrant administrative attention. SNMP exposes management data in the form of variables, or objects, on the managed systems, which describe the system configuration. These objects can then be queried (and sometimes set) by managing applications. The objects accessible via SNMP are organized in hierarchies. These hierarchies, and other metadata (such as types and descriptions of the objects), are described by Management Information Bases (MIBs).

A management information base (MIB) is a type of database used to manage the devices in a communications network. Technically, a MIB is a list of objects supported by the network device. A MIB database is hierarchical (tree-structured) and entries are addressed through object identifiers (OIDs). OIDs are written in dotted decimal notation. (e.g., 1.3.6.1.2.1). Each OID identifies an object that can be read or set via the Simple Network Management Protocol (SNMP).

A MIB is divided up into sets of related MIB objects. The sets of related MIB objects are stored in documents called MIB modules. A MIB module is a single document which describes a list of related objects which could be supported by a network device. Any network device which supports SNMP will support a standard required minimum set of MIB Modules. In other words, all SNMP enabled network devices must support the minimum set to comply with the standard. Optionally, the SNMP device may support some number of additional MIB modules which may be generic or enterprise specific. According to the standard, if the device supports any object in the MIB Module it must support all objects that the MIB module refers to, or depends on.

Figure 1:
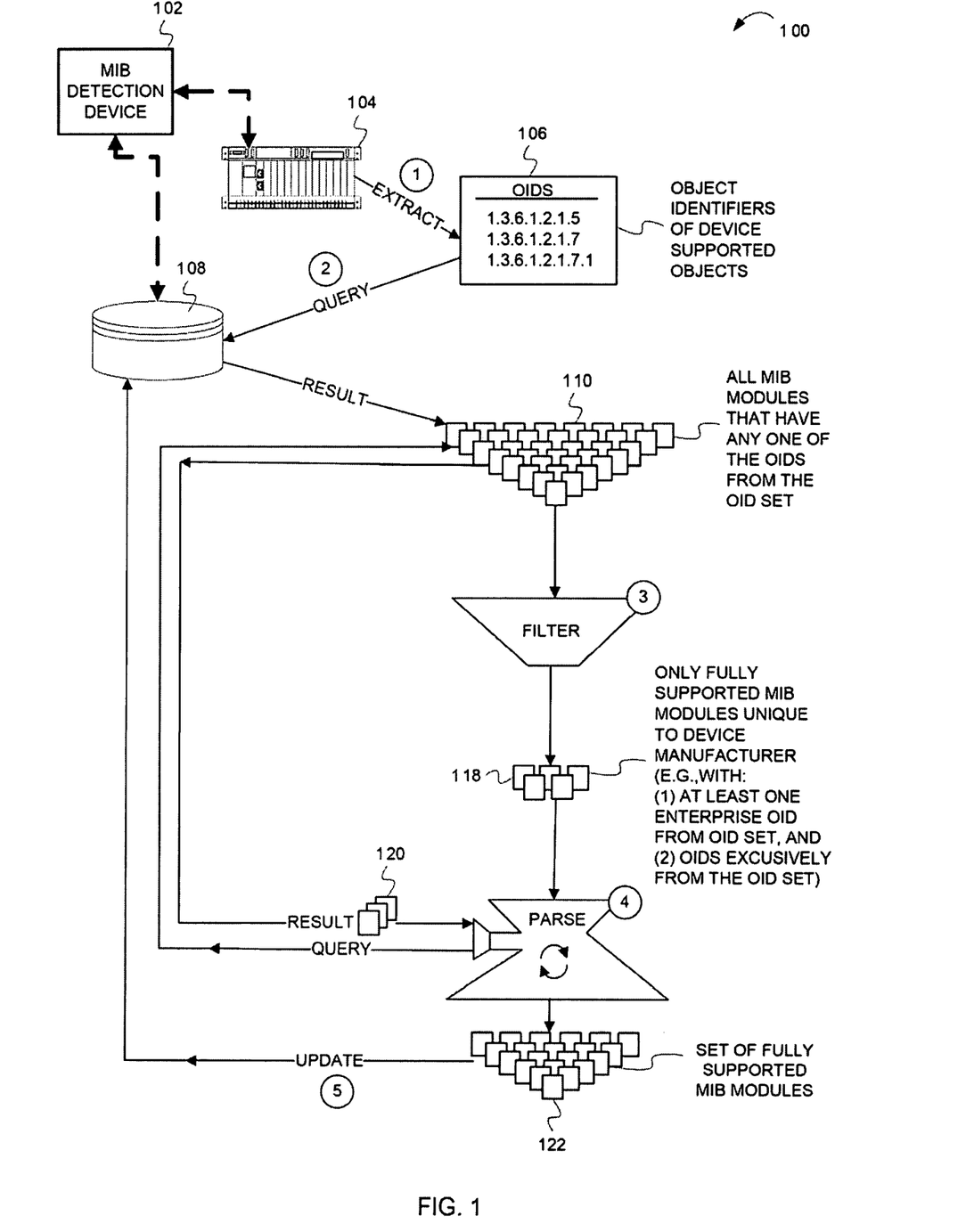
FIG. 1 is an illustration of an example MIB detection device 102 within an operating environment 100.

MIB modules, however, are sometimes difficult to track. As developers create more devices, the number of MIB modules increase. The developers who create MIB modules for a device must register some objects in MIB modules to obtain OIDs for the objects within the MIB modules. However, not all developers adhere to the standard. Manufacturers of network devices will sometimes provide a list of all MIB modules supported by a device. However, not all manufacturers can do this, either because the manufacturer may be defunct, or because the device may be older and no longer supported by the manufacturer. Consequently, network managers sometimes have difficulty tracking down a set of fully supported MIB modules for a network device. FIG. 1 shows a MIB detection device that can work in an operating environment to automatically determine a set of fully supported MIB modules for a network device.

FIG. 1 is an illustration of an example MIB detection device 102 within an operating environment 100. In FIG. 1, a MIB detection device 102 is connected to a network device 104 and an SNMP MIB module repository 108. The MIB detection device 102 can be connected to the network device 104 and the repository 108 via a communications network (not shown), via a wire or cable, wirelessly, or in some other way. Alternatively, the MIB detection device 102 could also be an element contained within any one, or both, of the network device 104 and the repository 108. Alternatively, elements of the MIB detection device 102 may be spread across the network device 104, the repository 108, and/or other devices not shown.

In stage "1", the MIB detection device 102 determines a set of all objects supported by the Simple Network Management Protocol enabled device 104. The MIB detection device 102 does so by extracting the objects using an SNMP "walk" function (e.g., SNMPWALK). An SNMP walk is a read-only process that will extract SNMP information from the device, including the SNMP objects supported by the device. The MIB detection device 102 can parse the objects to isolate the object identifiers ("OIDs") for the objects into an OID set 106.

In stage "2", the MIB detection device 102 queries the MIB module repository 108. An example of a MIB module repository is the Netcool® MIB Database, by International Business Machines® ("IBM"). The Netcool MIB Database is currently the most comprehensive SNMP MIB module database, containing tens of thousands of SNMP MIB modules. The MIB detection device 102 uses the OID set 106 as search parameters for the query. The query statement is an open conditional statement (e.g., Boolean "OR" statement) that searches for all OIDs individually. The query returns a result, a first set of MIB modules 110. The first set of MIB modules 110 includes all MIB modules from the repository 108 that that have any one of (i.e., at least one of) the OIDs from the OID set 106. The first set of MIB modules 110 represents "potentially" fully supported MIB modules. The first set of MIB modules 110 is "potentially" fully supported because some MIB modules may be fully supported (i.e., contain only supported objects), but some MIB modules may only be partially supported (i.e., contain some supported objects and other non-supported objects). By standard protocol, if a device supports one object in a MIB module, then it should also support all other objects in the MIB module, and consequently all other objects in other MIB modules that are referenced in the MIB module throughout a MIB. Developers, however, are not always careful or strict about protocol. As a result, a device may fully support some MIB modules and only partially support other MIB modules. It is important, however, for network managers to know which MIB modules are fully supported and which ones are partially supported. Consequently, the MIB detection device 102 performs filtering and parsing to isolate fully and partially supported MIB modules from the first set of MIB modules 110.

In stage "3", the MIB detection device 102 filters the first set to ascertain only fully supported MIB modules that are unique to the device manufacturer. The device manufacturer usually designs and tests its devices to be fully compatible with each other. In designing devices and network communication software, called "agents", for the devices, the manufacturer creates objects for use. The manufacturer is assigned a specific section of a branch in a MIB tree hierarchy. The branch is called the "enterprise" branch, and the specific section is sometimes referred to as the vendor specific "leaf" for the branch. More specifically, a MIB tree structure is like a tree divided into several different branches. Most of the branches are for standard type objects that that are required for all network management communications. However, one branch, the "enterprise" branch, is designated for objects designed by the manufacturers of devices that are specific to the devices. The enterprise branch requires all manufacturer specific objects, and MIB modules containing manufacturer specific objects, to comply with a pre-defined OID prefix, namely "1.3.6.1.4.1." The 1.3.6.1.4.1 prefix is part of a pattern for the enterprise branch, namely "1.3.6.1.4.1.x" where "1.3.6.1.4.1" represents the enterprise prefix and where "x" represents any additional numbers and decimals that define a manufacturer and any manufacturer specific objects. For example, IBMs enterprise specific enterprise designation is 1.3.6.1.4.1.2.

In the next section, and throughout this description, OIDs will be referred to as being "contained" within MIB modules. It should be understood, however, that only some portion(s) of the OID may be contained in the MID module. The MIB detection device 102, nevertheless, can interpret the MIB module to ascertain a full OID. Consequently, the OIDs, for brevity sake, are referred to herein as being "contained" within the MIB modules.

The MIB detection device 102 filters the first set of MIB modules 110 to isolate all MIB modules that define or "contain" both of the following: (1) at least one enterprise branch OID from the OID set 106; and (2) OIDs exclusively from the OID set 106. The filtering results in a second set of MIB modules 118 that is fully supported and unique to the device manufacturer. Filtering the first set of MIB modules 110 to contain at least one enterprise branch OID from the OID set 106 ensures that the MIB module was created specifically for use with the manufacturer specific device 104. Filtering the first set of MIB modules 110 to contain OIDs exclusively from the OID set ensures that the MIB module is a fully supported module. By combining both conditions (i.e., enterprise specificity and OID exclusivity), the MIB detection device 102 has determined an ideal starting point, on a leaf of the MIB tree hierarchy, on which to begin traversing the MIB tree back to a MIB tree root, which will discover all objects fully supported by the device 104 within the MIB.

In stage "4", the MIB detection device 102 traverses the MIB by repeating a parsing and querying process that includes the second set of MIB modules 118 and the first set of MIB modules 110. The MIB detection device 102 parses the IMPORTS section of the second set of MIB modules 118 to find dependant MIB modules. The IMPORTS section refers to other MIB modules that the MIB module relies, or depends, on. The MIB detection device 102 parses the IMPORTS section to find one or more dependant MIB modules. Then the MIB detection device 102 queries the first set of MIB modules 110 to retrieve the one or more dependant MIB modules. The query returns the dependant MIB modules, referred to herein as "retrieved" MIB modules 120. The MIB detection device 102 then repeats the same process for the retrieved MIB modules 120, by parsing the IMPORTS section of the retrieved MIB modules 120 and querying the first set of MIB modules 110 for dependent MIB modules. This process repeats until all dependant MIB modules are found. The MIB detection device 102 knows when all dependent MIB modules are found because the MIB detection device 102 eventually reaches a document from the first set of MID modules 110 that does not contain an IMPORTS section. This document is called the MIB root. The parsing and querying process results in a set of fully supported MIB modules 122 that can be used for managing the network device 104.

In stage "5", the MIB detection device 102 can perform additional processes, such as updating the repository 108 with information regarding the device 104. The MIB detection device 102 can also update the repository 108 with information on the MIB modules that are fully supported by the device 104. The MIB detection device 102 can also determine any partially supported MIB modules in the first set of MIB modules 110. The MIB detection device 102 can also update the repository 108 with information on the MIB modules that are partially supported by the device 104.

Example Operating Environments

Example MIB Detection Device Architecture

Figure 2:
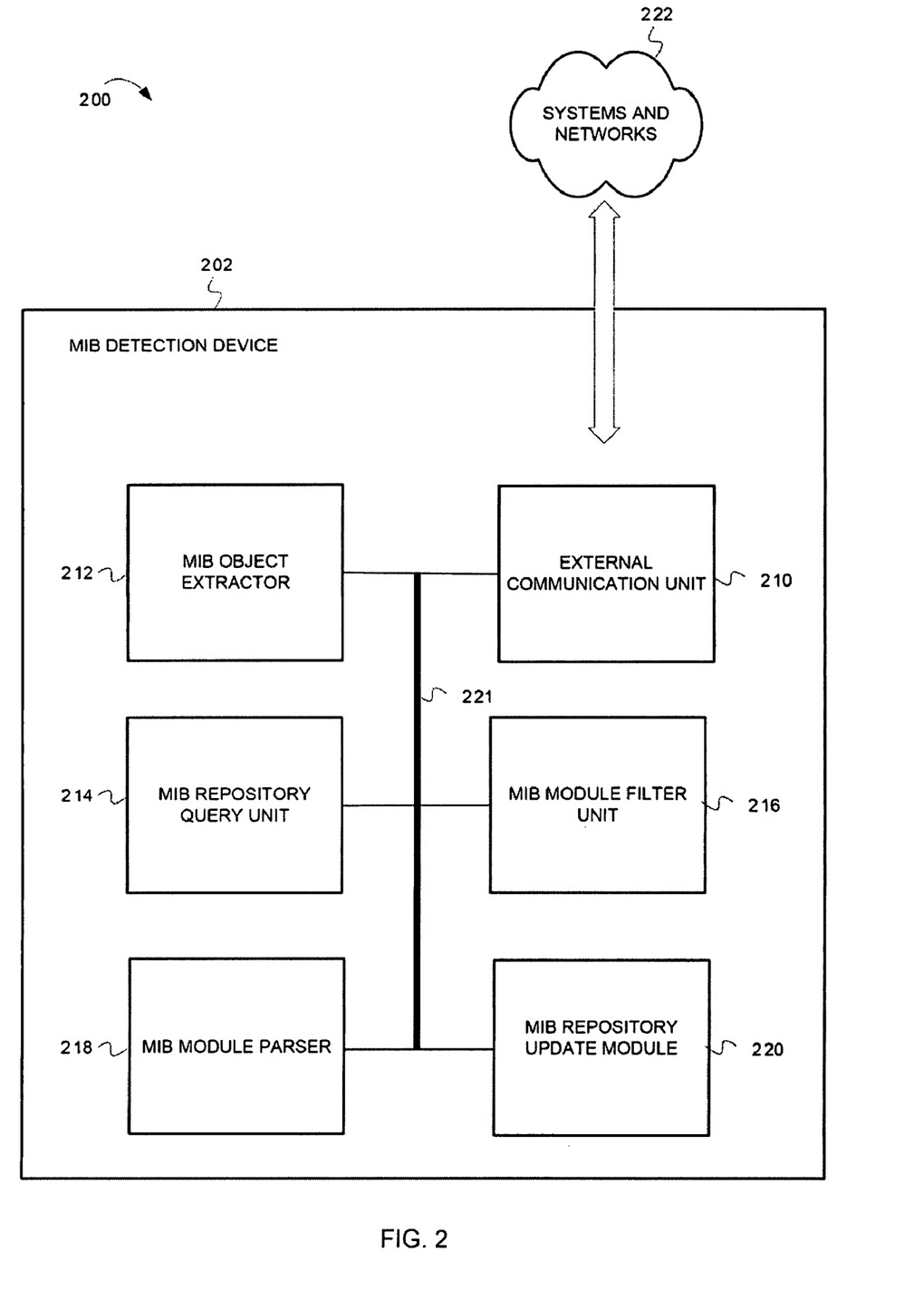
FIG. 2 is an illustration of an example MIB detection device architecture 200.

FIG. 2 is an illustration of an example MIB detection device architecture 200. In FIG. 2, the MIB detection device architecture 200 includes a MIB detection device 202 configured to interface with systems and networks 222. The MIB detection device 202 includes an external communication unit 210 configured to communicate with external devices and network elements.

The MIB detection device architecture 200 also includes a MIB object extractor 212 configured to extract MIB objects and OIDs from an SNMP enabled network device. The MIB object extractor 212 can parse the exported MIB objects and OIDs to isolate the OIDs into an OID set.

The MIB detection device architecture 200 also includes a MIB repository query unit 214 configured to query a MIB module repository. The MIB repository query unit 214 is configured to use an OID set as query parameters. The MIB repository query unit 214 structures the query in such a way that will retrieve from the MIB module repository all MIB modules that contain any of the OIDs listed in the query parameters.

The MIB detection device architecture 200 also includes a MIB module filter unit 216 configured to filter sets of MIB modules that contain OIDs of objects supported by the SNMP enabled device. For example, the MIB module filter unit 216 can filter sets of MIB modules that contain enterprise branch OIDs. The MIB module filter unit 216 can also filter sets of MIB modules that contain only OIDs from OID sets extracted by the MIB repository query unit 214. The MIB module filter unit 216 can also filter sets of MIB modules to determine fully supported MIB modules and partially supported MIB modules. The MIB module filter unit 216 can also filter out redundant MIB modules from MIB modules sets.

The MIB detection device architecture 200 also includes a MIB module parser 218 configured to parse MIB modules to find referenced (i.e., dependant) MIB modules from a MIB module set. The MIB module parser 218 can parse the IMPORTS section(s) of MIB modules to determine all dependent MIB modules. The MIB module parser 218 can also parse MIB modules to find OIDs within any portion of a MIB module document.

The MIB detection device architecture 200 also includes a MIB repository update module 220 configured to update a MIB repository, or associated data storage or data index structure, with information regarding fully and partially supported MIB modules. The MIB repository update module 220 can also provide indicators (e.g. messages, notes, tags, etc.) to indicate that a set of MIB modules is fully or partially supported by a SNMP device. The MIB repository update module 220 can also indicate unresolved OIDs from determined OID sets. Unresolved OIDs are OIDs that are not found on any MIB modules in a MIB module repository.

The MIB detection device architecture 200 also includes a communication interface 221 configured to facilitate communication between the components of the MIB detection device 202.

Each component shown in the MIB detection device architecture 200 is shown as a separate and distinct element. However, some functions performed by one component could be performed by other components. For example, the MIB module parser 218 could assist in isolating OIDs from an extracted set of MIB information. Furthermore, the components shown may all be contained in the MIB detection device 202, but some, or all, may be included in, or performed by, other devices on the systems and networks 222. Furthermore, the MIB detection device architecture 200 can be implemented as software, hardware, any combination thereof, or other forms of embodiments not listed.

Example Operations

This section describes operations associated with some embodiments of the invention. In the discussion below, the flow diagrams will be described with reference to accompanying block diagrams, also presented below. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). Moreover, some embodiments can perform less than all the operations shown in any flow diagram.

Figure 3:
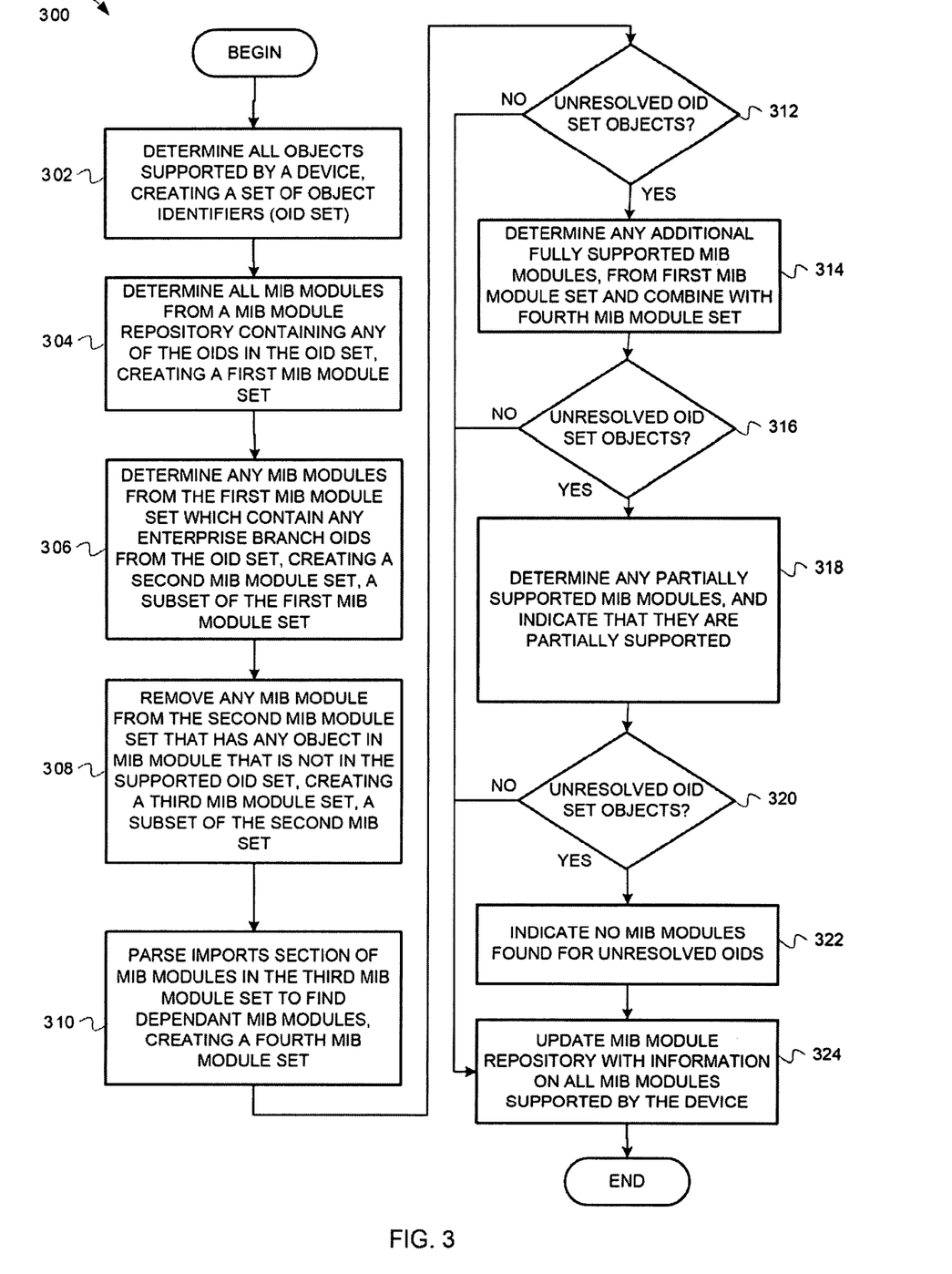
FIG. 3 is an example flow diagram 300 illustrating automatically determining MIB modules for an SNMP enabled device.
Figure 4:
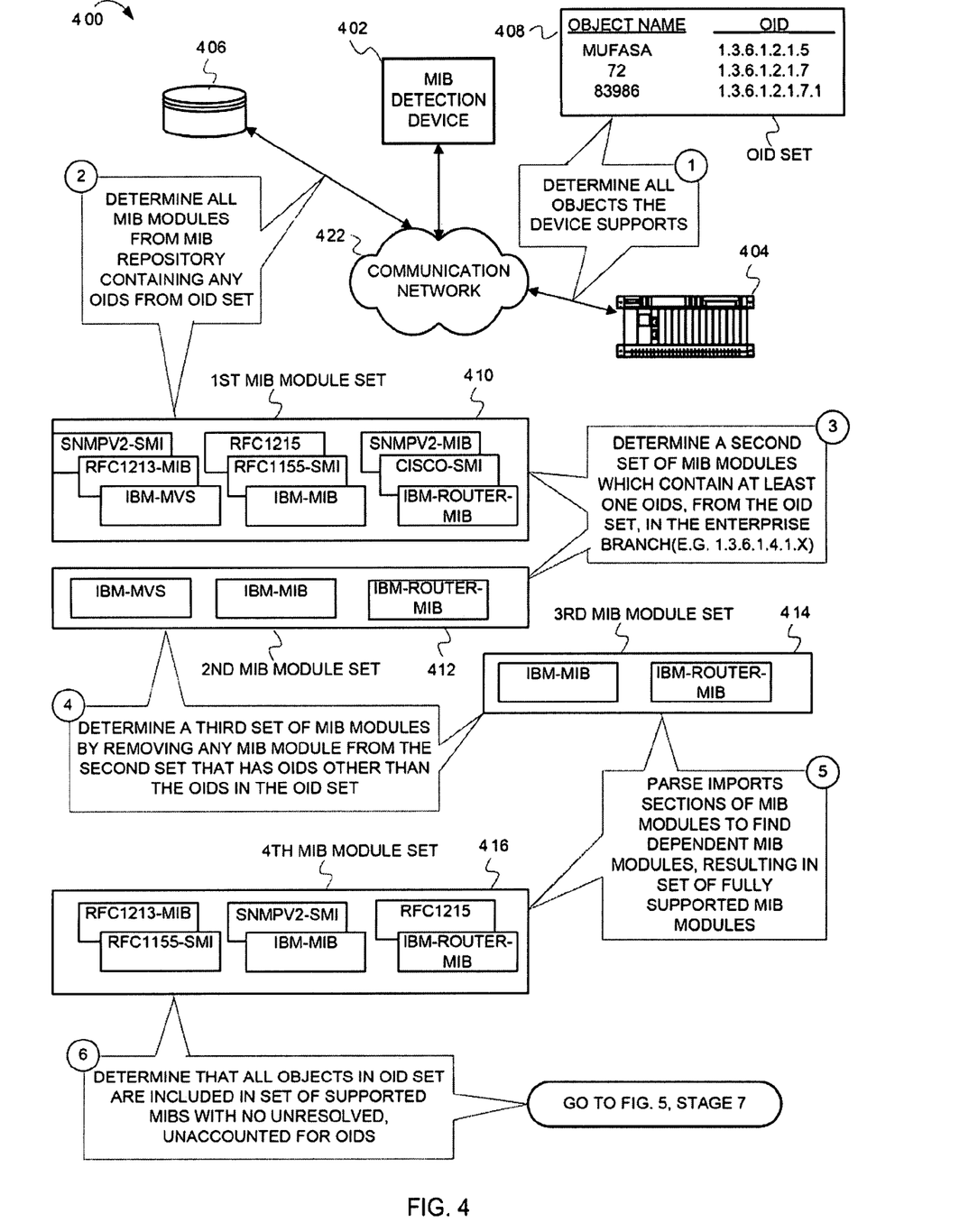
FIG. 4 and FIG. 5 illustrate an example MIB detection device 402 within an operating environment 400.
Figure 5:
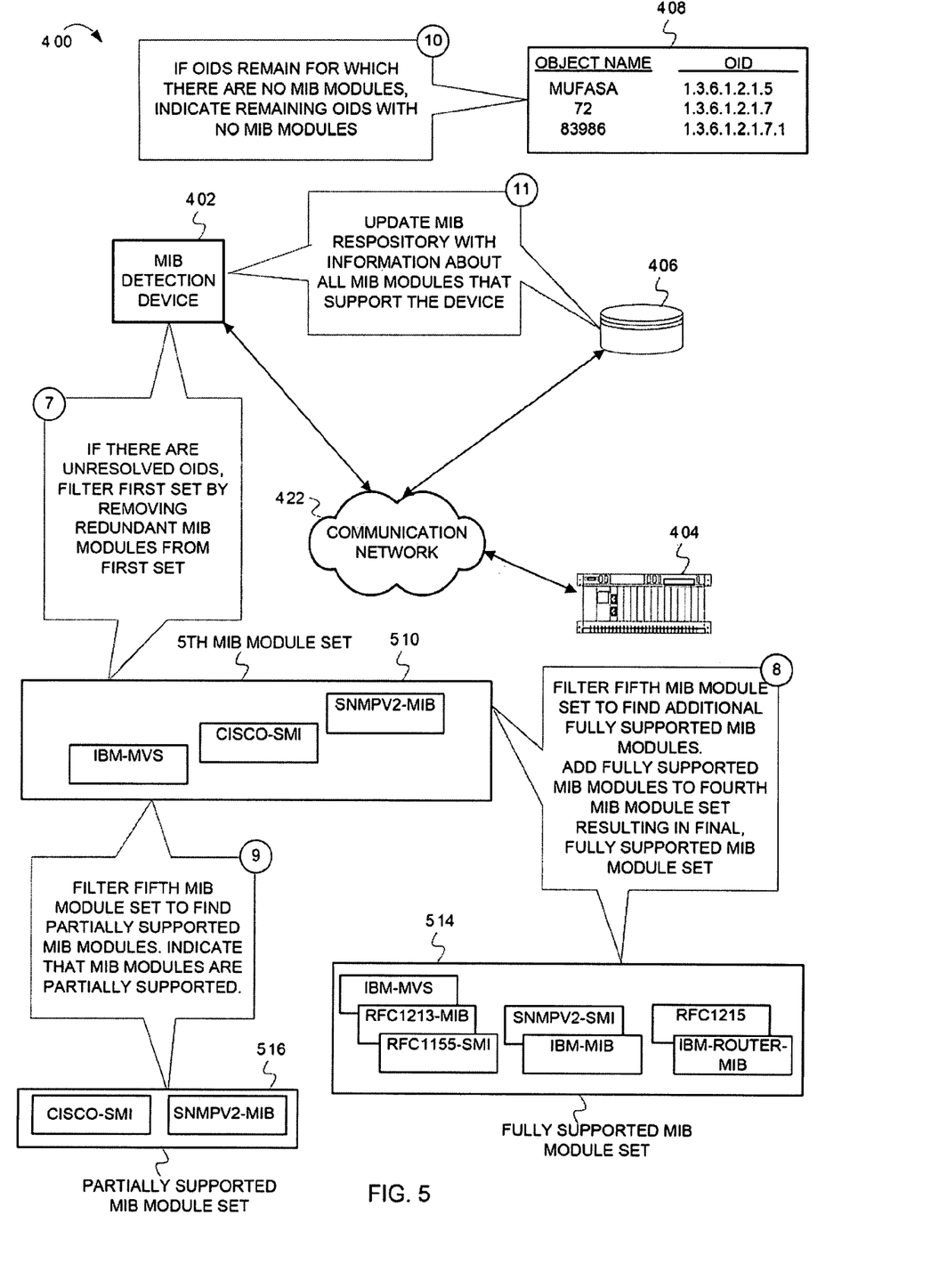

FIG. 3 is an example flow diagram illustrating automatically determining MIBs for a device. FIG. 4 and FIG. 5 illustrate an example MIB detection device 402, according to some embodiments of the invention. In FIG. 4 and FIG. 5, the MIB detection device 402 connects to a communications network 422. A MIB module repository (e.g., database) 406 is connected to the communication network 422. A network device 404 is also connected to the communication network 422. The network device 404 is an SNMP enabled device, meaning that it is managed according to the SNMP, and thus utilizes MIB objects. This description will present FIG. 3 in concert with FIG. 4 and FIG. 5.

In FIG. 3, a flow 300 begins at processing block 302, where a MIB detection device determines all SNMP objects supported by an SNMP enabled device, creating a set of object identifiers (OIDs). In FIG. 4, at stage "1", the MIB detection device 402 extracts a set of all supported objects from the network device 404, which is SNMP enabled. The MIB detection device 402 can use the SNMP "walk" functionality to return the set of object identifiers 408. The object identifiers are returned in decimal notation, along with object names and (e.g., "1.3.6.1.2.1.1.5=Mufasa; 1.3.6.1.2.1.1.7=72; 1.3.6.1.2.1.7.1=83986, etc.) The MIB detection device 402 can parse the results of the "walk" function to isolate the OIDs into the OID set 408.

In FIG. 3, the flow 300 continues at processing block 304, where the MIB detection device determines all MID modules containing any of the OIDs from the OID set, creating a first MIB module set. In FIG. 4, at stage "2" the MIB detection device 402 queries the repository 406 to determine MIB modules that contain OIDs listed in the OID set 408. The repository 406 contains a significant number of SNMP MIB modules. An example of such a repository is the Netcool® MIB Database, by International Business Machines®. The Netcool® MIB Database has thousands of SNMP MIBs. The MIB detection device 402 queries the repository 406 using the OIDs in the OID set 408 as search parameters. The repository 406 returns a first MIB module set 410 containing all MIB modules from the repository 406 that have at least one OID from the OID set 408. The first MIB module set 410 is a large set of potentially supported MIB modules. The MIB modules are "potentially" supported because even though a MIB module from the first MIB module set 410 contains an OID listed in the OID set 408, the OID in the MIB module may be a duplicate of an OID from a MIB that is not supported. Also, the MIB module in the first MIB module set 410 may only be partially supported, meaning that a MIB module in the first MIB module set 410 contains both a supported object and a non-supported object. The MIB modules in the first MIB module set 410 are defined by a module name (e.g., SNMPv2-SMI;RFC1213-MIB;RFC1215;RFC1155-SMI; SNMPv2-MIB;CISCO-SMI;CISCO-DSPU-MIB;IBM-MIB;IBM-ROUTER-MIB). The MIB modules, however, also have OIDs and other information normally contained within a MIB module document. For instance, every MIB modules contains an "IMPORTS" section, which refers to other MIB modules that "depend" upon the MIB module. In other words, other MIB modules are referenced within the IMPORTS section, which other MIB modules contain additional objects the network device 404 would need to be properly managed. The referenced MIB modules refer to other MIB modules, and so on, until reaching a root MIB module, which does not contain any referenced MIB modules. The IMPORTS section will be referred to again in conjunction with block 310 below.

In FIG. 3, the flow 300 continues at processing block 306, where the MIB detection device determines any MIB modules from the first MIB module set which contain any enterprise branch OIDs in the OID set. Thus, the MIB detection device creates a second MIB module set, a subset of the first MIB module set. In FIG. 4, at stage "3", the MID detection device 402 determines a second set of MID modules 412. The MIB detection device 402 can filter the first MIB module set 410 to find only MIB modules from the first MIB module set 410 that have an enterprise branch OID found in the OID set 408. An enterprise branch OID is an OID that follows the pattern 1.3.6.1.4.1.x, where "x" represents any additional numbers and decimals. The enterprise branch is a branch of a MIB hierarchy tree that contains manufacturer specific object identifiers. When a manufacturer develops a new MIB module for a device or device family, it must register the MIB module with a standards group. The standards group registers the developed MIB module with a unique object identifier within the enterprise branch. In other words, the unique object identifier starts with "1.3.6.1.4.1". Subsequently, those unique enterprise OIDs are programmed into a device, along with all other OIDs that the device supports. Thus, any objects that are extracted from the device, in stage "1", which follow the enterprise branch pattern are unique to the manufacturer of the device. Thus, the MIB detection device 402 filters the first MIB module set 410 to find the MIB modules that have at least one enterprise OID from the OID set 408. The resulting set is the second MIB module set 412.

In FIG. 3, the flow 300 continues at processing block 308, where the MIB detection device removes any MIB module from the second MIB module set that has any object in the MIB module that is not in the OID set, creating a third MIB module set, a subset of the second MIB set. In FIG. 4, at stage "4", the MIB detection device 402 determines a third set of MIB modules 414 by filtering out, or removing, any MIB modules from the second set 412 that have OIDs other than the OIDs in the OID set 408. In other words, the third set of MIB modules 414 only contains OIDs exclusively from the OID set 408. The MIB modules in the third set 414, therefore, are guaranteed to be fully supported by the device 404 because they have only OIDs extracted from the device 404, and they have at least one enterprise OID, which is specific to the device manufacturer.

In FIG. 3, the flow 300 continues at processing block 310, where the MIB detection device parses the IMPORTS sections of the MIB modules in the third MIB module set to find dependant MIB modules, creating a fourth MIB module set. In FIG. 4, at stage "5", the MIB detection device 402 parses the third MIB module set 414 to find dependent MIB modules, resulting in a fourth MID module set 416. The MID detection device 402 parses the IMPORTS section of each MIB module in the third MIB module set 414. The IMPORTS section of a MIB module includes references to other MIB modules that define or connect objects in the MIB module. If a MIB module is supported, then all other MIB modules that are connected to the MIB module are also fully supported. Because the third MIB module set contains unique and supported objects, it is at a very end of a MIB hierarchical tree. In other words, if a MIB hierarchical tree can be described like a normal tree, the MIB modules in the third MIB module set 414 are leaves on the tree. This comparison is useful because the MIB detection device 402 will begin to traverse the MIB tree until it reaches a root of the MIB tree. This means that the MIB detection device 402 will start far enough away from the root of the MIB module that it will be able to capture all MIB modules required for the MIB as it finds MIB modules referenced (i.e., connected, depended, associated) in the IMPORTS sections of the third MIB module set 414. Another way of referring to the MIB modules in the IMPORTS sections is to say that they are dependent, or additional MIB modules, because the MIB modules of the third set 414 rely or "depend" on them for additional objects and other information. Consequently, the MIB detection device 402 parses the IMPORTS sections, finds the additional "referenced" MIB modules, then retrieves them from the first MIB module set 410. The "referenced" MIB modules will be contained within the first MIB module set 410 because the query to the repository 406 at stage "2" already obtained all MIB modules from the repository 406 that contain at least one OID from the OID set 408. Each of the "referenced" MIB modules will already contain at least one OID from the OID set, consequently the MIB detection device 402 can query the first MIB module set 410 without having to retrieve them from the repository 406. In other embodiments, however, the MIB detection device 402 could instead retrieve the "referenced" MIB modules from the repository 406. Once the MIB detection device 402 retrieves the "referenced" MIB modules, it repeats the parsing for the retrieved MIB modules. In other words, it parses the IMPORTS section of the retrieved MIB modules to find additional "referenced" MIB modules in the retrieved MIB modules. This process continues until the MIB detection device 402 finds a MIB module that does not have an IMPORTS section. This MIB module will be the root of the MIB hierarchical tree. When the MID detection device 402 has found the root for all MIB modules in the third MIB module set 414, it combines all of the retrieved MIB modules with the MIB modules that were already in the third MIB module set 414 to create the fourth MIB module set 416. The fourth MIB module set 416 is a set of fully supported MIB modules and, if the device was properly designed for the SNMP, should contain all MIB modules necessary to manage the device. However, not all devices are designed properly, and some MIB modules in the repository may be incomplete. Consequently, the MIB detection device 402 can perform other operations to check for completeness.

In FIG. 3, the flow 300 continues at processing block 312, where the MIB detection device determines whether there are unresolved OID set objects. The MIB detection device 402 checks for unresolved OID set objects by comparing the OIDs in the OID set, one by one, to OIDs in the fourth MIB module set. If all OIDs from the OID set are found in the fourth MIB module set, then there are no unresolved OIDS. If there are no unresolved OID objects, or in other words if all objects in the OID set are included in the fourth MIB module set, then the process continues at block 324. Otherwise, the process continues at block 314. In FIG. 4, at stage "6", the MIB detection device 402 determines whether all objects in the OID set 408 are included in the set of supported MIBs (i.e., in the fourth MIB module set 416). In other words, all OIDs in the fourth MIB module set 416 should ideally also be contained within the OID set 408 if the device 404 is compliant with its standard. Thus, the MIB detection device 402 compares the OIDs in the OID set 408, one by one, to find it in the fourth MIB module set 416. If all OIDs from the OID set 408 are found in the fourth MIB module list 416, then the device 404 is compliant with the standard. The MIB detection device 402 can then indicate that the fourth MIB module set 416 is supported. If any OIDs from the OID set 408, however, are not found in the fourth MIB module set 416, then the device 404 is either not compliant with the standard or else the IMPORTS section in one or more of the supported MIB modules in the fourth MIB module set 416 are incomplete. The next portions of the flow 300, and many of the portions of FIG. 5, describe some additional processes or operations that the MIB detection device 402 can perform to check for, and report upon, the completeness of a MIB module set.

In FIG. 3, the flow 300 continues at processing block 314, where the MIB detection device determines any additional fully supported MIB modules and combines the additional fully supported MIB modules with the fourth MIB module set. In FIG. 5, at stage "7", if there are unresolved OIDs, the MIB detection device 402 filters the first MIB module set 410 and removes any redundant MIB modules from the first MIB module set 410 that are in the fourth MIB module set 416. The filtering results in a fifth MIB module set 510. The fifth MIB module set 510 will consist of either additional fully supported MIB modules or partially supported MIB modules. An additional fully supported MIB module is a MIB module in the fifth MIB module set 510 that contains only OIDs that are found exclusively in the OID set 408. A partially supported MIB module, however, is a MIB module in the fifth MIB module set 510 that contains at least one OID from the OID set 408, but at least one other OID that is not in the OID set 408. The MID detection device 402 therefore, filters the fifth MID module set 510 to isolate the additional fully supported MIB modules, if any, from the partially supported MIB modules, if any.

In stage "8", the MIB detection device 402 filters the fifth MIB module set 510 for additional fully supported MIB modules by parsing the MIB modules individually. The MIB detection device 402 filters each individual MIB module by finding an OID in the MIB module and comparing the found OID to an OID in the OID set 408. If the OIDs match, the MIB detection device 402 continues parsing for the next OID, and compares the next OID to the OID set 408. The MIB detection device 402 repeats the parsing and comparing until getting to the end of the MIB module. If the MIB detection device 402 gets to the end of the MIB module, and all of the OIDs matched, then the MIB detection device 402 knows that the MIB module is an additional fully supported MIB module. The MIB detection device 402 then combines the additional fully supported MIB modules, with the fourth MIB module list 416. After determining all additional fully supported MIB modules from the fifth MIB module set 510, and combining them with the fourth MIB module set 416, the resulting set is a final fully supported MIB module set 514.

In FIG. 3, the flow 300 continues at processing block 316, where the MIB detection device determines whether there are unresolved OID set objects. In other words, if all of the OIDs were resolved at block 314, then there are not more unresolved OID set objects. If there are no unresolved OID objects then the process continues at block 324. Otherwise, the process continues at block 318.

The flow 300 continues at processing block 318, where the MIB detection device determines any partially supported MIB modules and indicates that they are partially supported. In FIG. 5, stage "9", the MIB detection device 402 filters the fifth MIB module set 510 in one of two ways. If the MIB detection device 402 has already performed the process in stage "8", then all MIB modules in the fifth MIB module set 510 that weren't fully supported are partially supported. If, however, the MIB detection device 402 has not performed the process in stage "8" and instead performs the process in stage "9" first, then the MIB detection device 402 parses a MIB module and compares any OIDs from the MIB module to the OID set 408. If the OID matches, the MIB detection device 402 continues parsing for the next OID, and compares the next OID to the OID set 408. The MIB detection device 402 repeats the parsing and comparing until getting to the end of the MIB module. If the MIB detection device 402 finds even one OID that does not match an OID in the OID set 408, then the MIB detection device 402 knows that the MIB module is partially supported. The MIB detection device 402 places the partially supported MIB modules into a partially supported MIB module set 516. The MIB detection device 402 indicates the MIB modules in the partially supported MIB module set 516 as being partially supported. In some embodiments, the MIB detection device 402 reports all fully supported and partially supported MIB modules. Fully and partially supported MIB modules may be referred to collectively as "supported" MIB modules because at least some of the objects from the MIB module are known to be supported by the device.

In FIG. 3, the flow 300 continues at processing block 320, where the MIB detection device determines whether there are unresolved OID set objects. If there are no unresolved OID objects, then the process continues at block 324. Otherwise, the process continues at block 322.

The flow 300 continues at processing block 322, where the MIB detection device indicates that no MIB modules were found for the remaining unresolved OIDs. In FIG. 5, at stage "10", the MID detection device 402 indicates any remaining OIDs from the OID set 408 that were unresolved, meaning that no MIB modules were found in the repository 406 for some OIDs stored on the device 404. One way the MIB detection device 402 indicates that no MIB modules is to return an error message that lists the unresolved OIDs.

In FIG. 3, the flow 300 continues at processing block 324, where the MIB detection device updates the MIB database with information about all MIB modules that are supported by the device. In FIG. 5, at stage "11", the MIB detection device 402 updates the repository 406 with information, such as regarding which MIB modules are fully supported and which ones are partially supported. For example, the repository 406 could have an index that stores information about network devices, like device 404. The index could contain a listing of all MIB modules that support the device 404. The index could also include identifying information about the device 404, such as make and model. By updating the repository 406 with this information, then the repository 406 could be subsequently queried with device identification information instead of just OIDs. The repository could then return the set of fully supported objects and partially supported objects. The MIB detection device 402 could also update any IMPORTS sections that were incomplete.

Additional Example Operating Environments

Example MIB Detection Device Network

Figure 6:
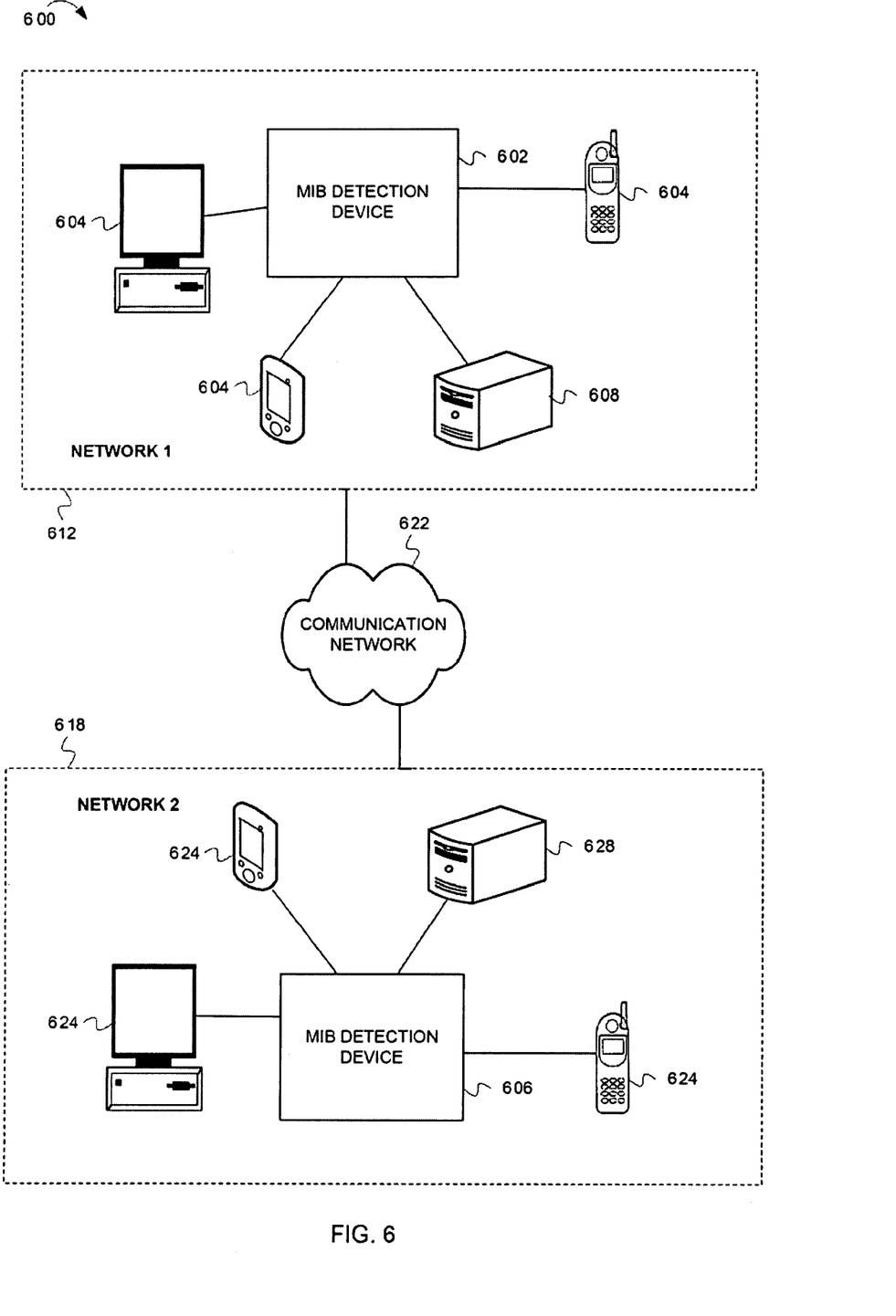
FIG. 6 is an illustration of example MIB detection devices 602 and 606 on a network 600.

FIG. 6 is an illustration of a MIB detection device 602 on a network 600. In FIG. 6, the network 600, also referred to as a MIB detection device network 600, includes a first local network 612 that includes network devices 604 and 608 that can use the MIB detection device 602. Example network devices 604 and 608 can include personal computers, personal digital assistants, mobile telephones, mainframes, minicomputers, laptops, servers, or the like. In FIG. 6, some network devices 604 can be client devices ("clients") that can work in conjunction with a server device 608 ("server"). Any one of the network clients 604 and server 608 can be embodied as the computer system described in FIG. 7. A communications network 622 connects a second local network 618 to the first local network 612. The second local network 618 also includes client 624 and a server 628 that can use a MIB detection device 606.

Still referring to FIG. 6, the communications network 612 can be a local area network (LAN) or a wide area network (WAN). The communications network 612 can include any suitable technology, such as Public Switched Telephone Network (PSTN), Ethernet, 802.11g, SONET, etc. For simplicity, the MIB detection device network 600 shows only six clients 604, 624 and two servers 608, 628 connected to the communications network 622. In practice, there may be a different number of clients and servers. Also, in some instances, a device may perform the functions of both a client and a server. Additionally, die clients 604, 624 can connect to the communications network 622 and exchange data with other devices in their respective networks 612, 618 or other networks (not shown). In addition, the MIB detection devices 602 and 606 may not be standalone devices. For example, the MIB detection device 602 may be distributed across multiple machines, perhaps including the server 608. The MIB detection device 602 may be embodied as hardware, software, or a combination of hardware and software in a server, such as the server 608. One or both of the MIB detection devices 602 and 606 may also be embodied in one or more client machines, possibly including one or more of the clients 604 and 624. Functionality for automatically discovering fully supported MIB module sets can be embodied in one or more server machines or distributed as tasks to client machines accessing the virtual universe. For example, determining objects from SNMP enabled devices, filtering MIB modules, parsing MIB modules, etc., may be performed as a background task on client machines distributed by servers.

Example MIB Detection Device Computer System

Figure 7:
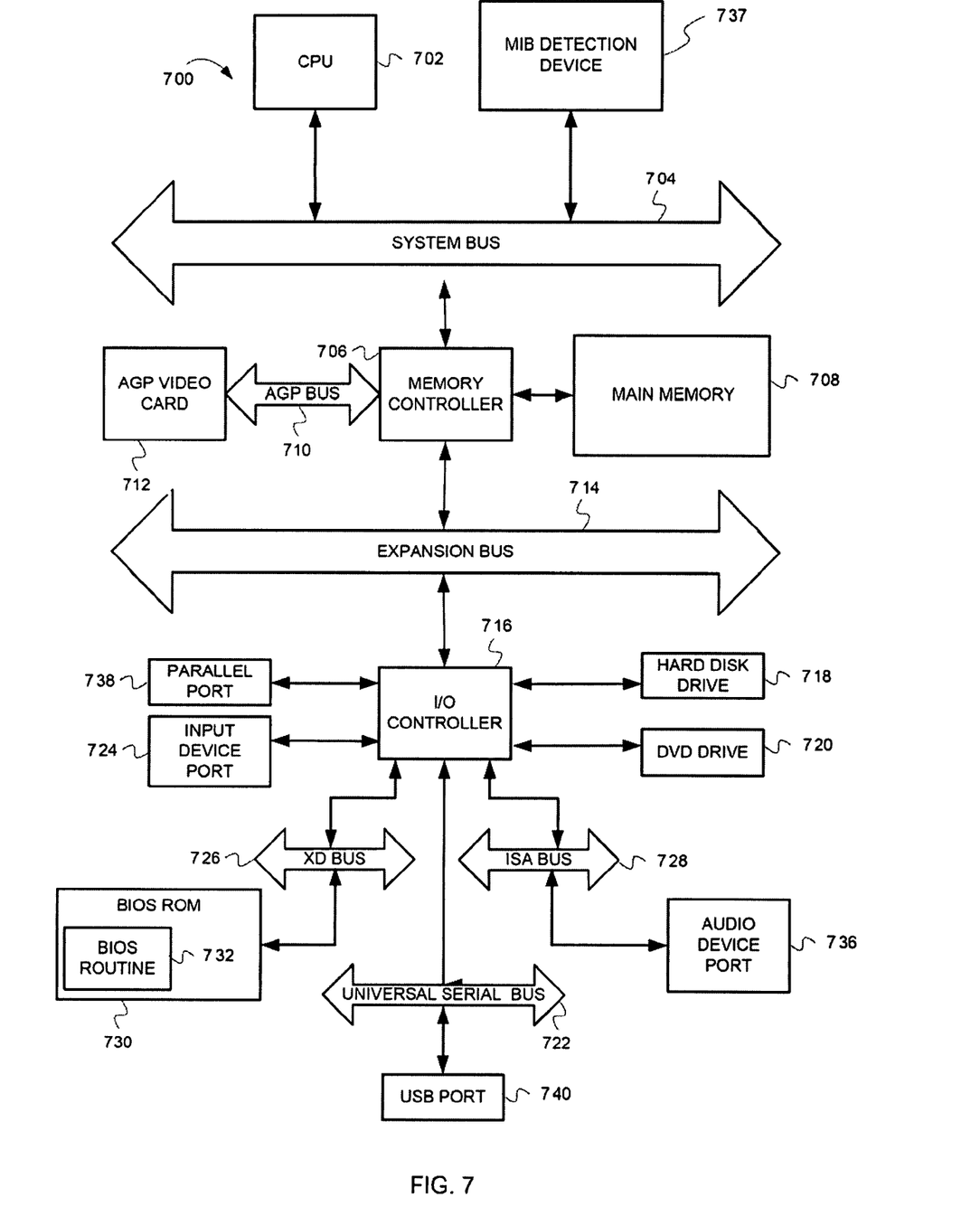
FIG. 7 is an illustration of an example MIB detection device computer system 700.

FIG. 7 is an illustration of a MIB detection device computer system 700. In FIG. 7, the MIB detection device computer system 700 ("computer system") includes a CPU 702 connected to a system bus 704. The system bus 704 is connected to a memory controller 706 (also called a north bridge), which is connected to a main memory unit 708, AGP bus 710 and AGP video card 712. The main memory unit 708 can include any suitable memory random access memory (RAM), such as synchronous dynamic RAM, extended data output RAM, etc.

In one embodiment, the computer system 700 includes a MIB detection device 737. The MIB detection device 737 can process communications, commands, or other information, to automatically determine all supported MIB modules for an SNMP enabled device. The MIB detection device 737 is shown connected to the system bus 704, however the MIB detection device 737 could be connected to a different bus or device within the computer system 700. The MIB detection device 737 can include software modules that utilize main memory 708. For instance, the MIB detection device 737 can wholly or partially be embodied as a program product in the main memory 708. The MIB detection device 737 can be embodied as logic in the CPU 702 and/or a co-processor, one of multiple cores in the CPU 702, etc.

An expansion bus 714 connects the memory controller 706 to an input/output (I/O) controller 716 (also called a south bridge). According to embodiments, the expansion bus 714 can be include a peripheral component interconnect (PCI) bus, PCIX bus, PC Card bus, CardBus bus, InfiniBand bus, or an industry standard architecture (ISA) bus, etc.

The I/O controller is connected to a hard disk drive (HDD) 718, digital versatile disk (DVD) 720, input device ports 724 (e.g., keyboard port, mouse port, and joystick port), parallel port 738, and a universal serial bus (USB) 722. The USB 722 is connected to a USB port 740. The I/O controller 716 is also connected to an XD bus 726 and an ISA bus 728. The ISA bus 728 is connected to an audio device port 736, while the XD bus 726 is connected to BIOS read only memory (ROM) 730.

In some embodiments, the computer system 700 can include additional peripheral devices and/or more than one of each component shown in FIG. 7. For example, in some embodiments, the computer system 700 can include multiple external multiple CPUs 702. In some embodiments, any of the components can be integrated or subdivided.

Any component of the computer system 700 can be implemented as hardware, firmware, and/or machine-readable media including instructions for performing the operations described herein.

The described embodiments may be provided as a computer program product, or software, that may include a machine-readable medium having stored thereon instructions, which may be used to program a computer system (or other electronic device(s)) to perform a process according to embodiments of the invention(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method, comprising:
automatically filtering a first set of management information base modules to isolate management information base modules in the first set that are both fully supported by a Simple Network Management Protocol enabled device and that are unique to a manufacturer of the device, resulting in a second set of management information base modules;
parsing the second set to determine management information base modules referenced in the second set;
retrieving, from the first set, the management information base modules referenced in the second set; and
repeating the parsing and retrieving for the referenced management information base modules to determine additional referenced management information base modules, said repeating continuing until reaching a management information base hierarchy root, resulting in a third set of management information base modules, wherein the third set of management information base modules represents a supported set of objects for managing the device.

2. The method of claim 1, further comprising:
determining a set of all objects supported by the device, wherein the supported objects are identified with a set of object identifiers; and
querying a management information base module repository using the set of object identifiers that identify the supported objects as search parameters to determine the first set of management information base modules from the repository, wherein the first set of management information base modules indicate at least one object identifier from the set of object identifiers.

3. The method of claim 2, wherein automatically filtering the first set of management information base modules comprises isolating those of the management information base modules from the first set that individually indicate exclusively the set of object identifiers that identify the supported objects and that indicate a manufacturer.

4. The method of claim 2, further comprising:
checking the set of object identifiers to determine any object identifiers that were not found in the repository; and
indicating the object identifiers that were not found in the repository.

5. The method of claim 2, further comprising:
comparing the third set to the first set to determine that all management information base modules in the first set are included within the third set.

6. The method of claim 5, wherein the third set of management information base modules comprises fully supported management information base modules, and wherein said comparing comprises:
removing redundant management information base modules in the first set that are in the third set, wherein management information base modules that remain after removing the redundant management information base modules comprise a fourth set of management information base modules comprising any one or more of partially supported management information base modules and additional fully supported management information base modules not already in the third set and;
determining those of the management information base modules in the fourth set that indicate only object identifiers from the set of object identifiers as the additional fully supported management information base modules; and
determining management information base modules in the fourth set that indicate at least one object identifier from the set of object identifiers and at least one object identifier that is not in the set of object identifiers as the partially supported management information base modules.

7. The method of claim 6, further comprising:
adding the additional fully supported management information base modules to the third set, resulting in a fifth set of management information base modules representing all fully supported management information base modules for the device; and
indicating the partially supported set of management information base modules as being partially supported.

8. The method of claim 7, further comprising:
updating an index in the repository with information relating to the third set and the partially supported set of management information base modules.

9. The method of claim 1, wherein automatically parsing the second set comprises automatically parsing the IMPORTS sections of the management information base modules in the second set to determine the referenced management information base modules.

10. A network comprising:
a network device configured to communicate data to a communications network using a Simple Network Management Protocol; and
a management information base module detection device configured to connect to any one of the network device and the communication network, wherein the management information base module detection device comprises
a management information base module filter unit configured to filter a first set of management information base modules to isolate all management information base modules from the first set that are both unique to a manufacturer of the network device and that are fully supported by the network device, to determine a second set of management information base modules, and a management information base module parser configured to
parse the second set to determine all management information base modules referenced in the second set,
retrieve, from the first set, the management information base modules referenced in the second set, to determine retrieved management information base modules, and
parse all retrieved management information base modules to retrieve additional management information base modules, said management information base module parser to parse and retrieve referenced management information base modules until obtaining all management information base modules from the first set that are dependent on the second set.

11. The network of claim 10, further comprising:
a management information base object extractor configured to determine a set of all objects supported by the network device, wherein the supported objects are identified with object identifiers, and wherein the management information base object extractor is further configured to isolate the object identifiers into a set of object identifiers; and
a management information base repository query unit configured to query a management information base module repository using the set of object identifiers as search parameters to determine all management information base modules from the repository that contain at least one of the object identifiers in the set of object identifiers, said management information base repository query unit configure to determine the first set of management information base modules.

12. The network of claim 10, further comprising:
a management information base repository update module configured to update a management information base repository with information regarding fully and partially supported management information base modules.

13. The network of claim 10, further comprising:
a management information base module repository configured to store Simple Network Management Protocol management information base modules.

14. One or more tangible machine-readable storage media encoded with a computer program having instructions which when executed by a set of one or more processors causes the set of one or more processors to perform operations comprising:
automatically filtering a first set of management information base modules to isolate management information base modules in the first set that are both fully supported by a Simple Network Management Protocol enabled device and that are unique to a manufacturer of the device, resulting in a second set of management information base modules;
parsing the second set to determine management information base modules referenced in the second set;
retrieving, from the first set, the management information base modules referenced in the second set; and
repeating the parsing and retrieving for the referenced management information base modules to determine additional retrieved management information base modules, said repeating continuing until reaching a management information base hierarchy root, resulting in a third set of management information base modules, wherein the third set of management information base modules represents a supported set of objects for managing the device.

15. The machine-readable media of claim 14, wherein the operations further comprise:
determining a set of all objects supported by the device, wherein the supported objects are identified with set of object identifiers; and
querying a management information base module repository using the set of object identifiers that identify the supported objects as search parameters to determine the first set of management information base modules from the repository, wherein the first set of management information base modules indicate at least one object identifier from the set of object identifiers.

16. The machine-readable media of claim 15, wherein the filtering operation comprises isolating those of the management information base modules from the first set that individually indicate exclusively the set of object identifiers that identify the supported objects and that indicate a manufacturer.

17. The machine-readable media of claim 15, wherein the operations further comprise:
checking the set of object identifiers to determine any object identifiers that were not found in the repository; and
indicating the object identifiers that were not found in the repository.

18. The machine-readable media of claim 15, wherein the operations further comprise comparing the third set to the first set to determine that all management information base modules in the first set are contained within the third set.

19. The machine-readable media of claim 18, wherein the third set of management information base modules comprises fully supported management information base modules, and wherein the comparing operation further comprises:
removing redundant management information base modules in the first set that are in the third set, wherein management information base modules that remain after removing the redundant management information base modules comprise a fourth set of management information base modules comprising any one or more of partially supported management information base modules and additional fully supported management information base modules that are not in the third set and;
determining those of the management information base modules in the fourth set that indicate only object identifiers from the set of object identifiers as the additional fully supported management information base modules; and
determining management information base modules in the fourth set that indicate at least one object identifier from the set of object identifiers and at least one object identifier that is not in the set of object identifiers as the partially supported management information base modules.

20. The machine-readable media of claim 14, wherein the parsing the second set operation and the parsing the retrieved management information base modules operation comprise parsing the IMPORTS sections of the management information base modules to determine the referenced management information base modules and the additional management information base modules.

* * * * *